United States Patent [19]

Tien

[11] Patent Number: 5,620,120
[45] Date of Patent: Apr. 15, 1997

[54] FIXING APPARATUS FOR A PORTABLE TELEPHONE

[76] Inventor: Tse-hsiung Tien, 7th Fl., No. 1, Alley 8, Lane 554, Pei-an Rd., Taipei, Taiwan

[21] Appl. No.: 455,100

[22] Filed: May 31, 1995

[51] Int. Cl.⁶ .......................... B65D 39/08; B65D 43/00
[52] U.S. Cl. .................. 224/199; 224/194; 224/197; 224/271; 224/272; 224/902; 224/904; 224/908
[58] Field of Search ...................... 224/902, 904, 224/910, 914, 908, 909, 191 R, 225, 226, 228, 232, 242, 251, 252, 268, 269, 199, 271, 272, 930; 241/3.1, 3.12, 590, 597, 592, 637, 702

[56] References Cited

U.S. PATENT DOCUMENTS

| | | | |
|---|---|---|---|
| 1,222,264 | 4/1917 | Cabanne | 224/271 |
| 3,743,147 | 7/1973 | Wilczynski | 224/199 |
| 3,878,589 | 4/1975 | Schaefer | 24/222 R |
| 4,419,794 | 12/1983 | Horton, Jr. et al. | 24/667 |
| 4,676,420 | 6/1987 | Sharp | 224/197 |
| 4,718,586 | 1/1988 | Hagino | 224/197 |
| 5,201,858 | 4/1993 | Otrusina | 224/197 |

*Primary Examiner*—Henry J. Recla
*Assistant Examiner*—Kam R. Shah
*Attorney, Agent, or Firm*—Oppenheimer Poms Smith

[57] ABSTRACT

A fixing apparatus for a portable telephone includes an engaging device connected to the portable telephone, a socket for detachably receiving the engaging device, and a cramp connected to the socket for fixing itself and the socket on an objective body such as a belt. The engaging device is allowed to slide in the socket and may be manually made to turn substantially ninety-degrees in the socket thereby being located in place in the socket. When the engaging device is located in place in the socket, it may be manually made to turn ninety-degrees in the socket and may be manually pulled to slide out from the socket.

7 Claims, 9 Drawing Sheets

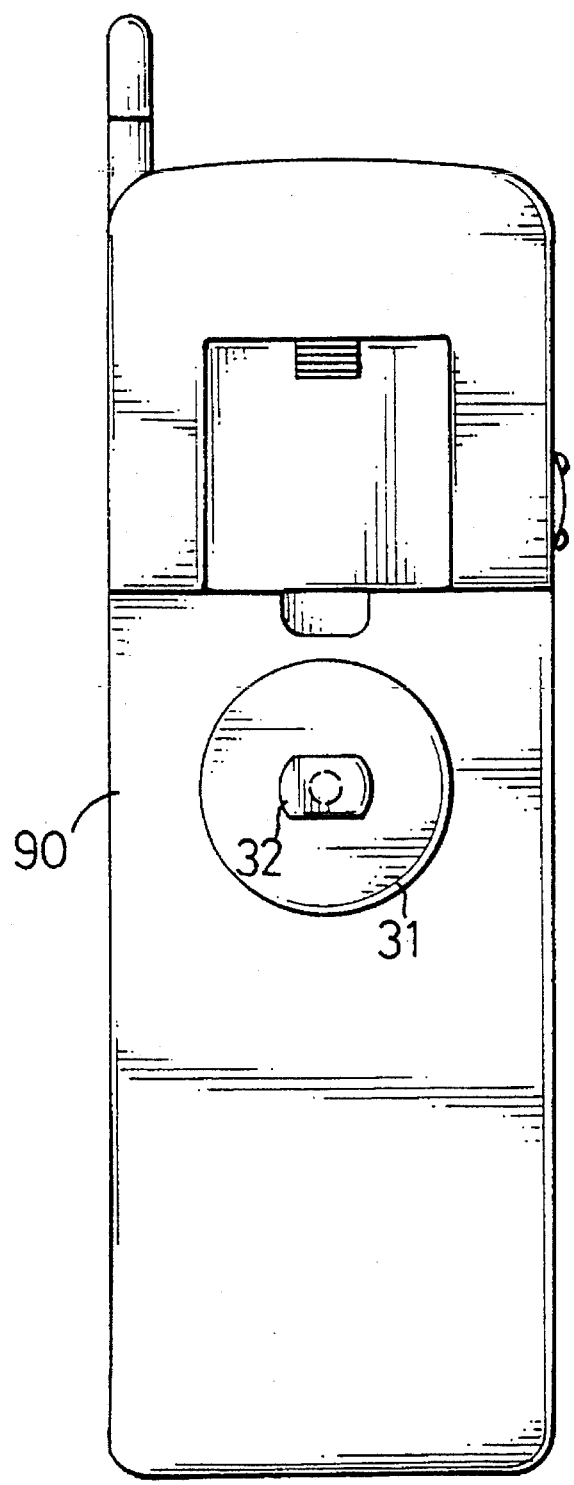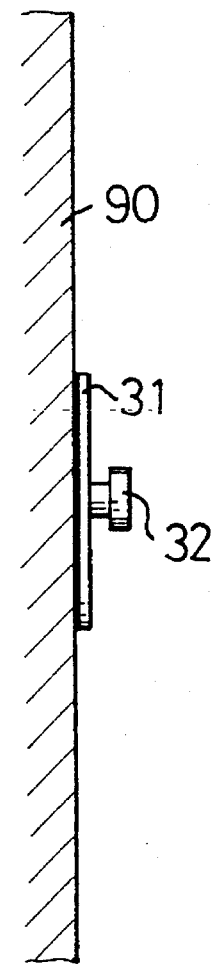
FIG.9
FIG.8

5,620,120

FIXING APPARATUS FOR A PORTABLE TELEPHONE

BACKGROUND OF THE INVENTION

1. Field of the Invention

The present invention relates to a fixing apparatus for a portable telephone, and more particularly to one which is easily operated and with an excellent fixing effect.

2. Description of the Prior Art

Portable telephones are popular at the present time. Since the portable telephone is carried by a user and transported by the same person frequently, it is apt to drop from the user's body if the attachment therebetween is not strong enough. FIG. 12 illustrates a portable telephone 5, a leather pouch 50, and a conventional fixing device attached on the pouch 50 for fixing the pouch 50 and the portable telephone 5 on a belt 60 of a user. The conventional fixing device basically contains an ear 51 attached on the pouch 50 by a rivet 52. The conventional fixing device utilizes a tension in the ear 51 for fixing the pouch 50 on the belt 60. However the ear 51 is apt to lose its tension after long term use thus causing the pouch 50 and the portable telephone 5 to drop from the belt 60. Moreover, the portable telephone 5 and the pouch 50 are apt to lift up and drop from the belt 60 especially when the user is sitting down.

The present invention has arisen to mitigate and/or obviate the afore-described disadvantages of the conventional fixing device for the portable telephone.

SUMMARY OF THE INVENTION

The primary objective of the present invention is to provide an improved fixing apparatus for a portable telephone thus preventing the latter from dropping from a belt or the like.

In accordance with one aspect of the invention, there is provided a fixing apparatus for a portable telephone which is enclosed in an pouch, the fixing apparatus comprising:

an engaging means extending from the pouch, a socket for detachably receiving the engaging means, and a cramp connected to the socket for fixing itself and the socket on an objective body;

the engaging means comprising a substantially elliptic plate which defines a long axis and a short axis and a neck extending from substantially a center of the elliptic plate and firmly connected to the pouch;

the socket comprising a base plate and an upper plate connected to the base plate, the base plate defining a long cutout from one side thereof up to a physically central point thereof, a first wall being formed along a periphery of the base plate, a second wall being projected from the base plate substantially surrounding a periphery of the long cutout thus defining a ledge portion between the long cutout and the second wall, the second wall including two parallel straight portions and a C-shaped portion connected to the two parallel straight portions;

the engaging means being sized to be slidable through the ledge portion around the long cutout, with the neck passing through the long cutout and the substantially elliptic plate sliding along the ledge portion in the long axis direction;

whereby the engaging means is manually made to turn substantially ninety-degrees in the C-shaped portion of the second wall when the substantially elliptic plate thereof slides to touch the C-shaped portion of the second wall, thereby locating the engaging means in the C-shaped portion of the second wall of the socket in place. When the engaging means is located in place in the socket, it may be manually made to turn a ninety-degrees in the socket and may be manually pulled to slide out from the socket.

Further objectives and advantages of the present invention will become apparent from a careful reading of the detailed description provided hereinbelow, with appropriate reference to the accompanying drawings.

BRIEF DESCRIPTION OF THE DRAWINGS

FIG. 8 illustrates another embodiment of the fixing apparatus of this invention, where the engaging means is directly connected to a portable telephone;

FIG. 9 is side view showing a connection between the engaging means and a surface of the portable telephone;

DETAILED DESCRIPTION OF THE PREFERRED EMBODIMENT

Figure 1:
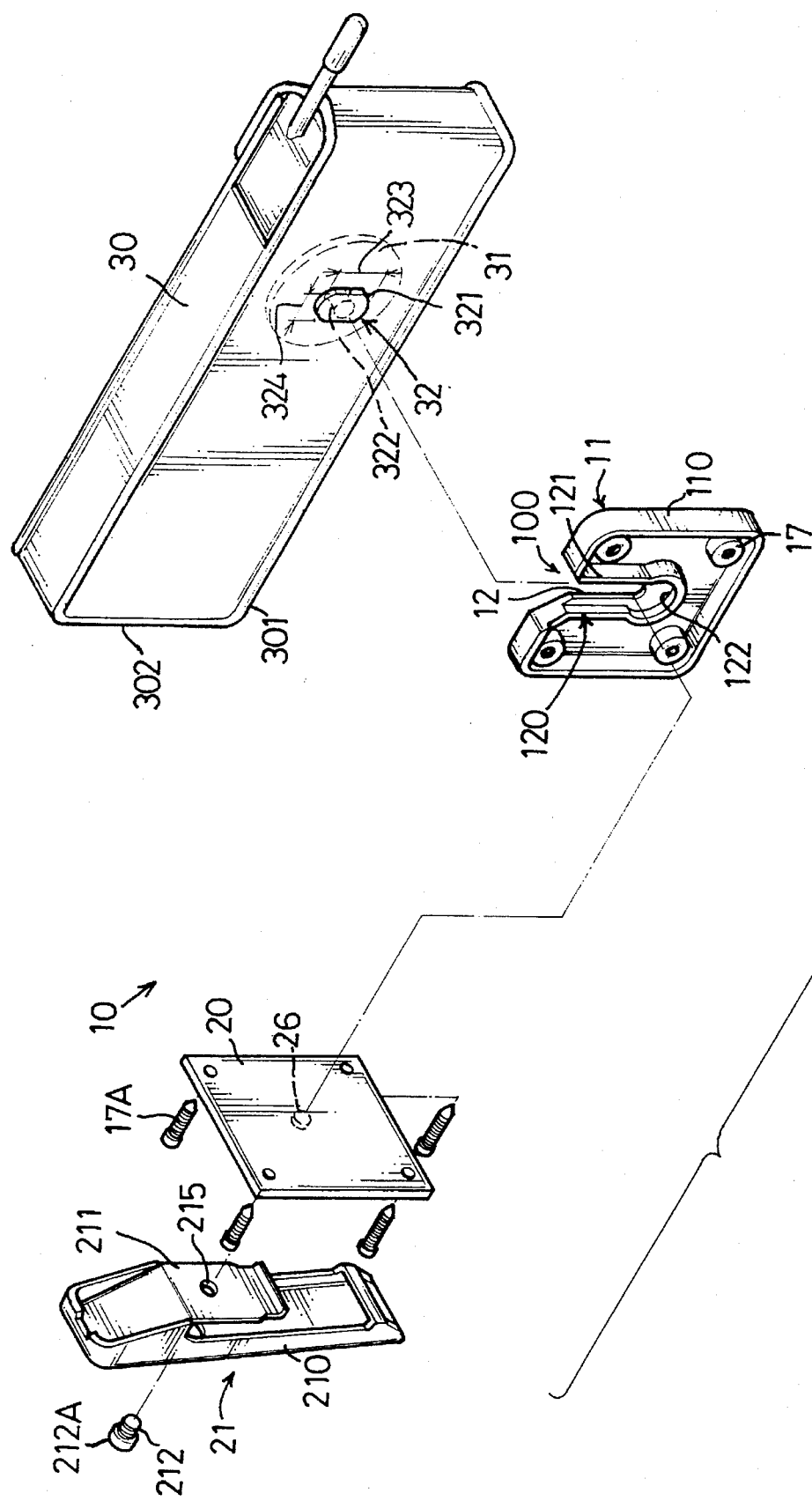
FIG. 1 is an exploded view of a fixing apparatus in accordance with the present invention.
Figure 3:
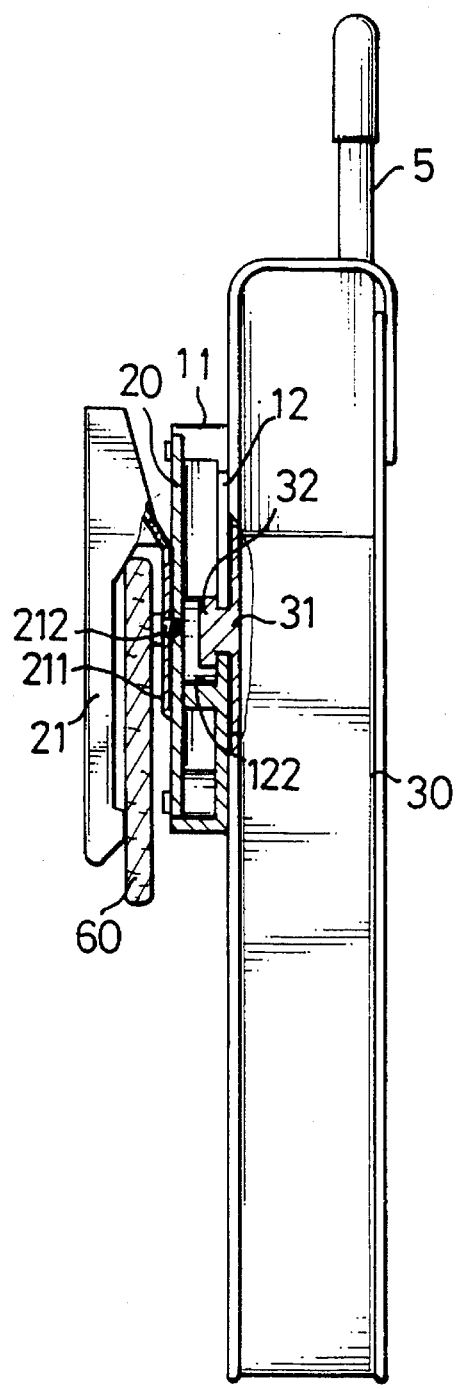
FIG. 3 illustrates a side view of the portable telephone being fixed on a belt, where a portion of the fixing apparatus is shown in a cross-sectional view.
Figure 12:
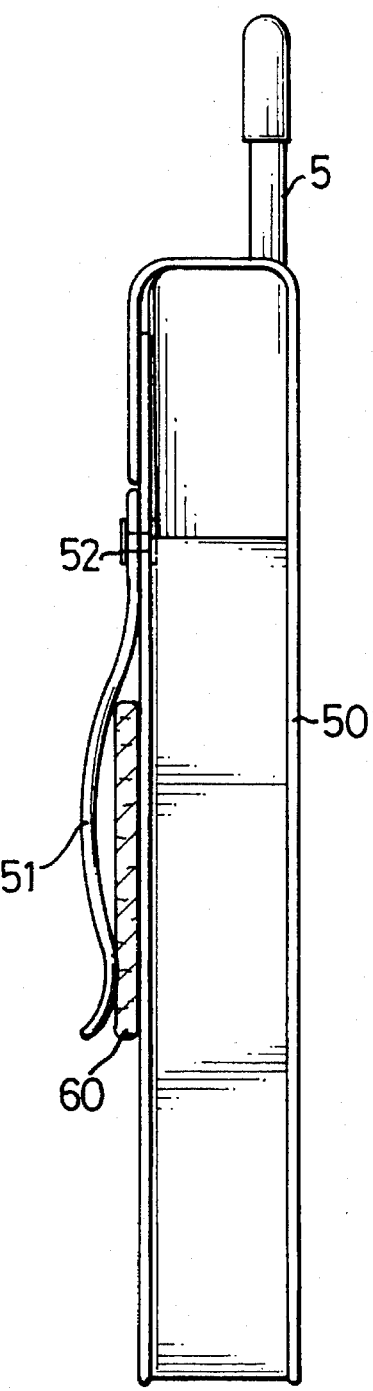
FIG. 12 illustrates a conventional fixing apparatus attached to a leather pouch which encloses a portable telephone and the fixing apparatus is fixed on a belt.

Referring to the drawings and initially to FIG. 1, a fixing apparatus for a portable telephone of the present invention comprises an engaging means 32 extending from a leather pouch 30 which encloses a portable telephone, a socket 10 for detachably receiving the engaging means 32, and a cramp connected to the socket 10 for fixing itself and the socket 10 on a belt or the like. The leather pouch 30 is rectangularly shaped and includes two relatively long sides 301 and two relatively short sides 302. The engaging means 32 comprises a substantially elliptic plate 321 and a neck 322 extending from substantially a center of the elliptic plate 321 and passing through the leather pouch 30. The substantially elliptic plate 321 defines a long axis 323 and a short axis 324 through the center thereof. The neck 322 extends through the leather pouch 30 and is firmly connected to a positioning plate 31 which is firmly attached to an inner wall of the pouch 30 by means of gluing or stitching. The long axis 323 of the engaging means 32 is substantially perpendicular to the relatively long sides of the pouch 30. The socket 10 comprises a base plate 11 and an upper plate 20 connected to the base plate 11. The base plate 11 defines a long cutout 100 from one side thereof up to a physically central point thereof. A first wall 110 is formed along a periphery of the base plate 11. A second wall 120 is projected from the base plate 11 substantially surrounding a periphery of the cutout 100 thus defining a ledge portion 12 between the cutout 100 and the second wall 120. Specifically, the second wall 120 includes two parallel straight portions 121 and a C-shaped portion 122 connected to the two parallel straight portions 121. Four bosses 17 extend respectively from four corners of the base plate 11 and each boss 17 has an identical height which is less than the height of the first wall 110. The second wall 120 has a height identical to that of the bosses 17. The upper plate 20 is attached to the base plate 11 by means of four screws 17A. The cramp 21 has a relatively long prong 210 and a relatively short prong 211 connected to the relatively long prong 210. The relatively short prong 211 defines a hole 215 therein and the upper plate 20 defines a threaded recess 26 therein thus allowing a bolt 212 to engage with the relatively prong 211 to the upper plate 20. Also referring to FIG. 3, when the cramp 21 is worn on a belt 60, the relatively short prong 211 exerts tension on the belt 60 thus fixing the cramp 21 together with the socket 10 on the belt 60. The bolt 212 has a head 212A abutting against the belt 60 thus strengthening the fixing of the cramp 21 on the belt 60.

Figure 2:
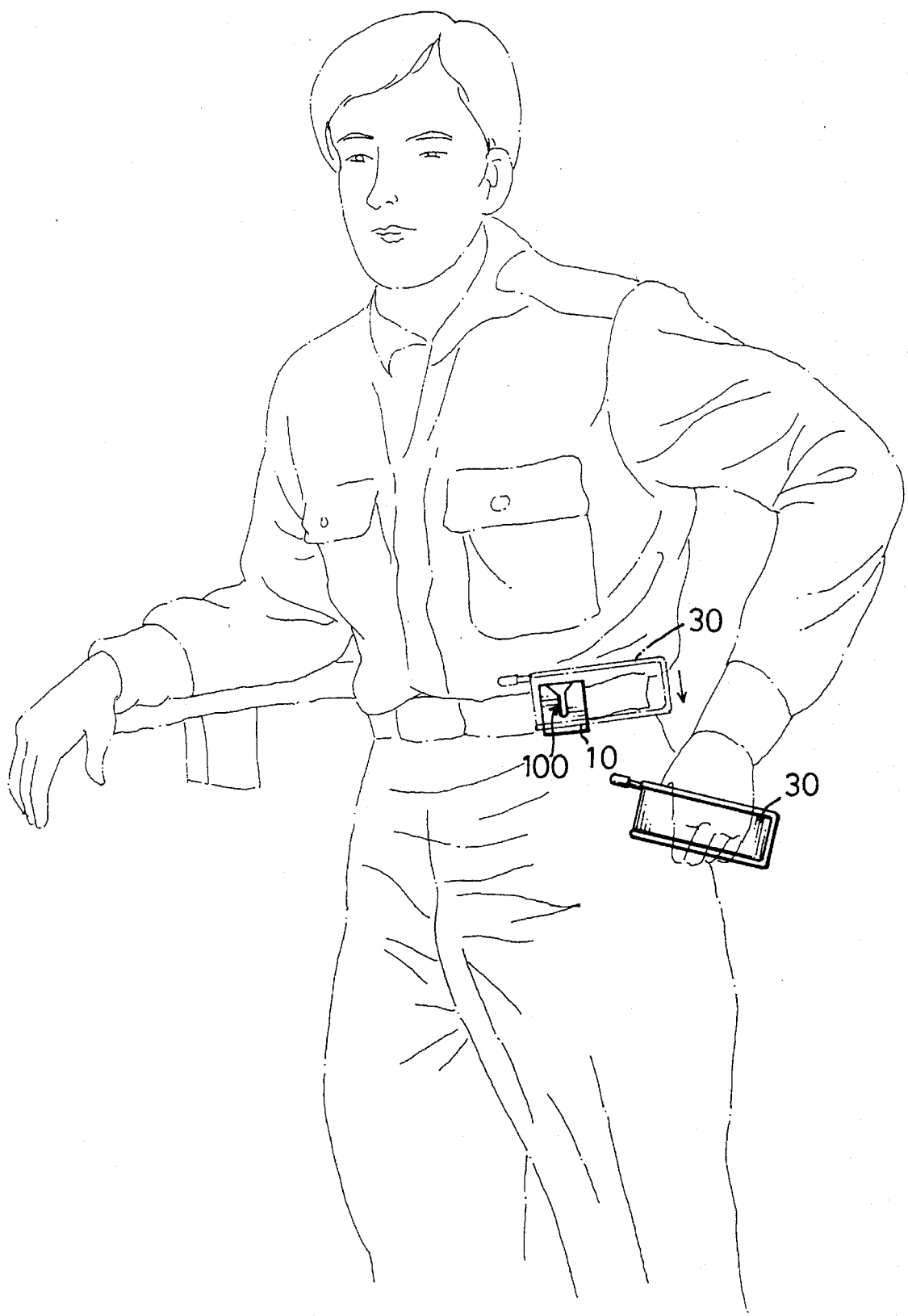
FIG. 2 illustrates a user is placing a portable telephone into a positioning socket of the fixing apparatus of the present invention.
Figure 4:
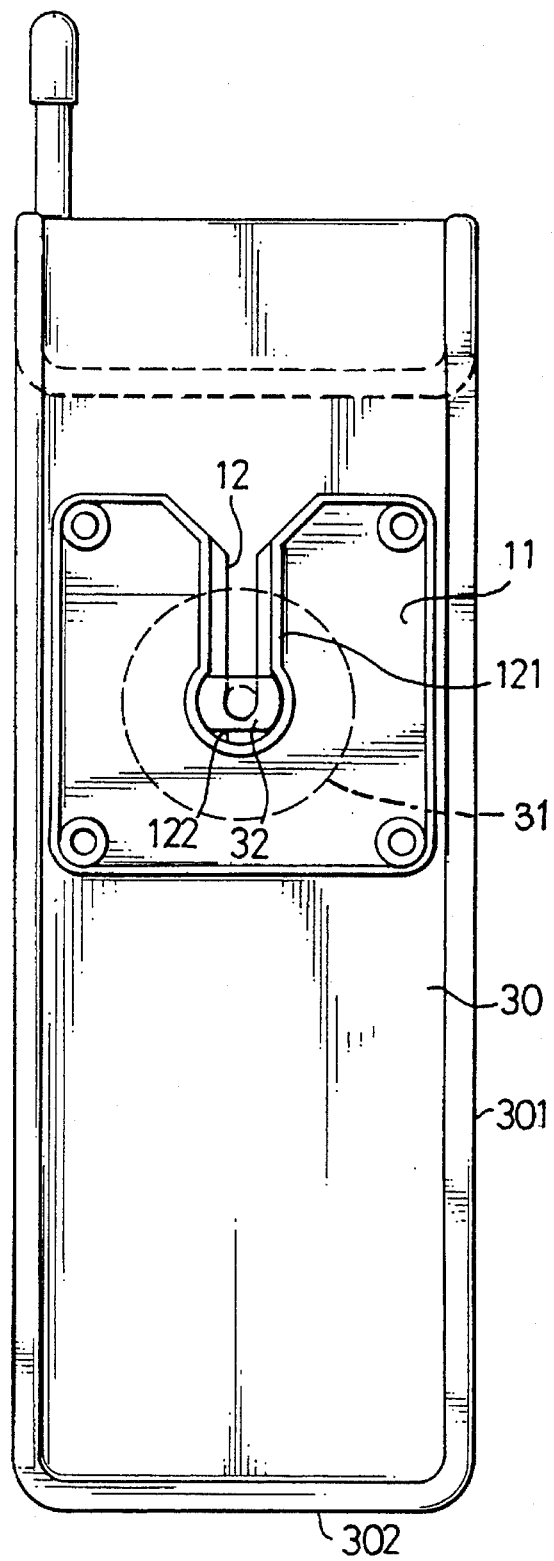
FIG. 4 illustrates an engaging means of the fixing apparatus of the present invention is received in place in the socket of the fixing apparatus of the present invention.

Further referring to FIG. 1, the engaging means 32 is sized to be slidable through the ledge portion 12 around the cutout 100. Specifically, the neck 322 will pass through the cutout 100 and the substantially elliptic plate 321 will slide along the ledge portion 12. It should be noted that the width of the ledge portion 12, i.e., the distance between the two parallel straight portions 121 of the second wall 120, is slightly less than the length of the long axis of the substantially elliptic plate 321 yet is greater than the short axis of the substantially elliptic plate 321. Therefore, the engaging means 32 is slidable through the cutout 100 only in a direction parallel to its long axis 323. When the engaging means 32 slides to touch the C-shaped portion 122 of the second wall 120, the user may make a 90 degree turn of the portable telephone thus making the substantially elliptic plate 321 to make a corresponding turn in the C-shaped portion 122 of the second wall 120, thereby locating the engaging means 32 in the socket 10 in place as shown in FIG. 4. It is noted that the C-shaped portion 122 is sized to allow the substantially elliptic plate 321 to make a circular turn therein. Referring to FIG. 2, the leather pouch 30 as shown in phantom lines is in a ready to move position in which the leather pouch 30 can be either pulled up to leave the socket 10 or can be made a 90 degree turn thereon and retained in a firm connection with the socket 10 in place. When the engaging device 32 is located in place in the socket 10, it may be manually made to turn ninety-degrees in the socket 10 and may be manually pulled to slide out from the socket 10.

Figure 5:
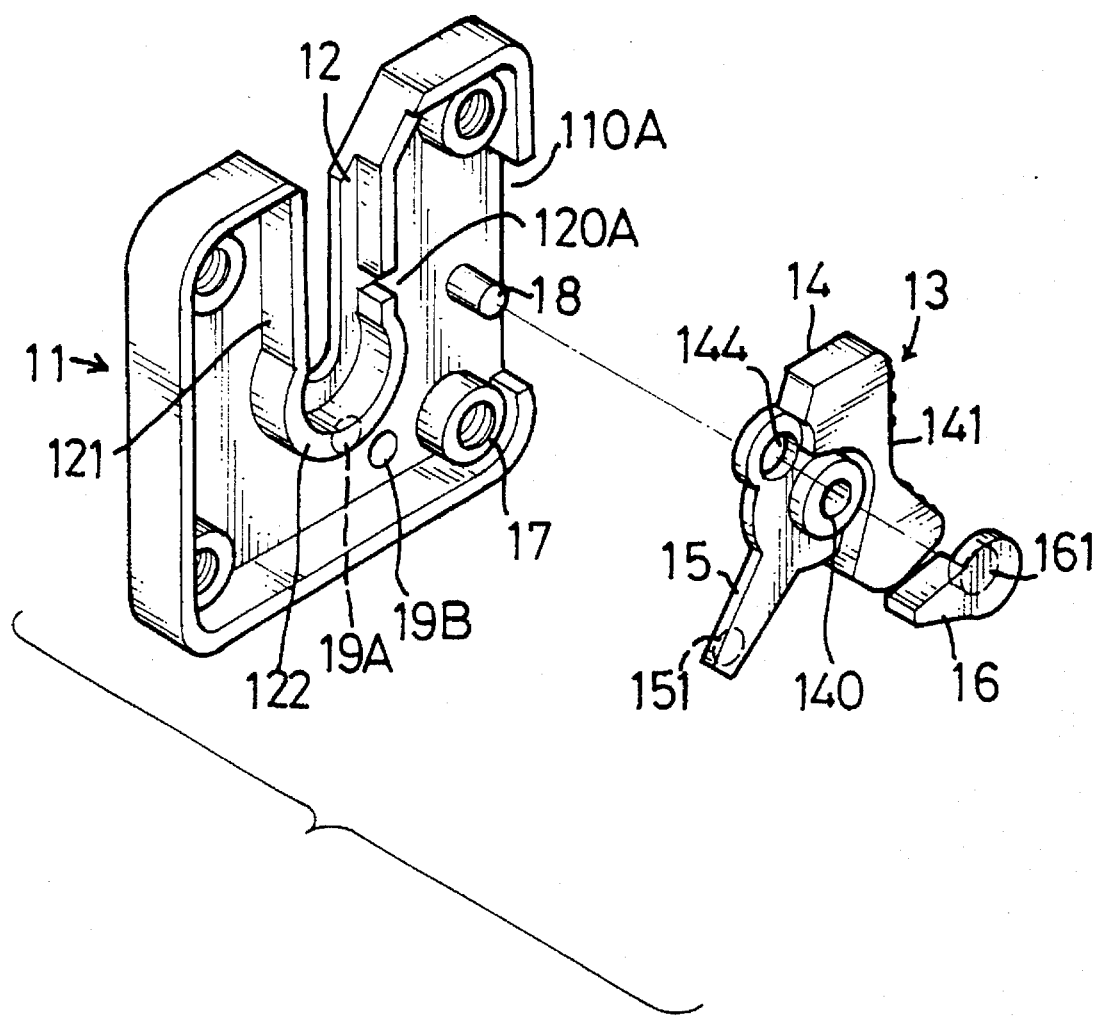
FIG. 5 illustrates an exploded view of a switch which is installed in a modified socket of this invention.

The embodiment as described is good enough for most users. However, for some users who have to crouch from time to time during working are apt to turn his/her leather pouch 30 to a ready to move position (see FIG. 2) for comfort, therefore, the leather pouch 30 together with the portable telephone are apt to be lifted up from the socket 10 and drop. Referring to FIG. 5, a switch 13 is added to the base plate 11 of the previous embodiment for forming a second embodiment. For installing the switch 13 on the base plate 11, the latter is modified. A pivot 18 is projected from the base plate 11 substantially between two of the bosses 17. A cutout 110A is defined in the first wall 110 near the pivot 18. A cutout 120A is defined in the second wall 120 substantially in an interconnection of one of the straight portions 121 and the C-shaped portion 122. A first recess 19A and a second recess 19B are defined in the base plate 11. The switch 13 comprises a switch body 14 which includes a boss 140 for pivotally receiving the pivot 18 projected from the base plate 11 and a saddle portion 141, a first tongue 15 extended from the switch body 14, and a second tongue 16 pivotally connected to the switch body 14. The switch body 14 defines a hole 144 at a corner thereof. Actually the second tongue 16 has a rod 161 projected therefrom for pivotally engaging to the hole 144 of the switch body 14. The first tongue 15 includes a protrusion 151 sized to be received in either of the two recesses 19A and 19B of the switch body 14.

Figure 6:
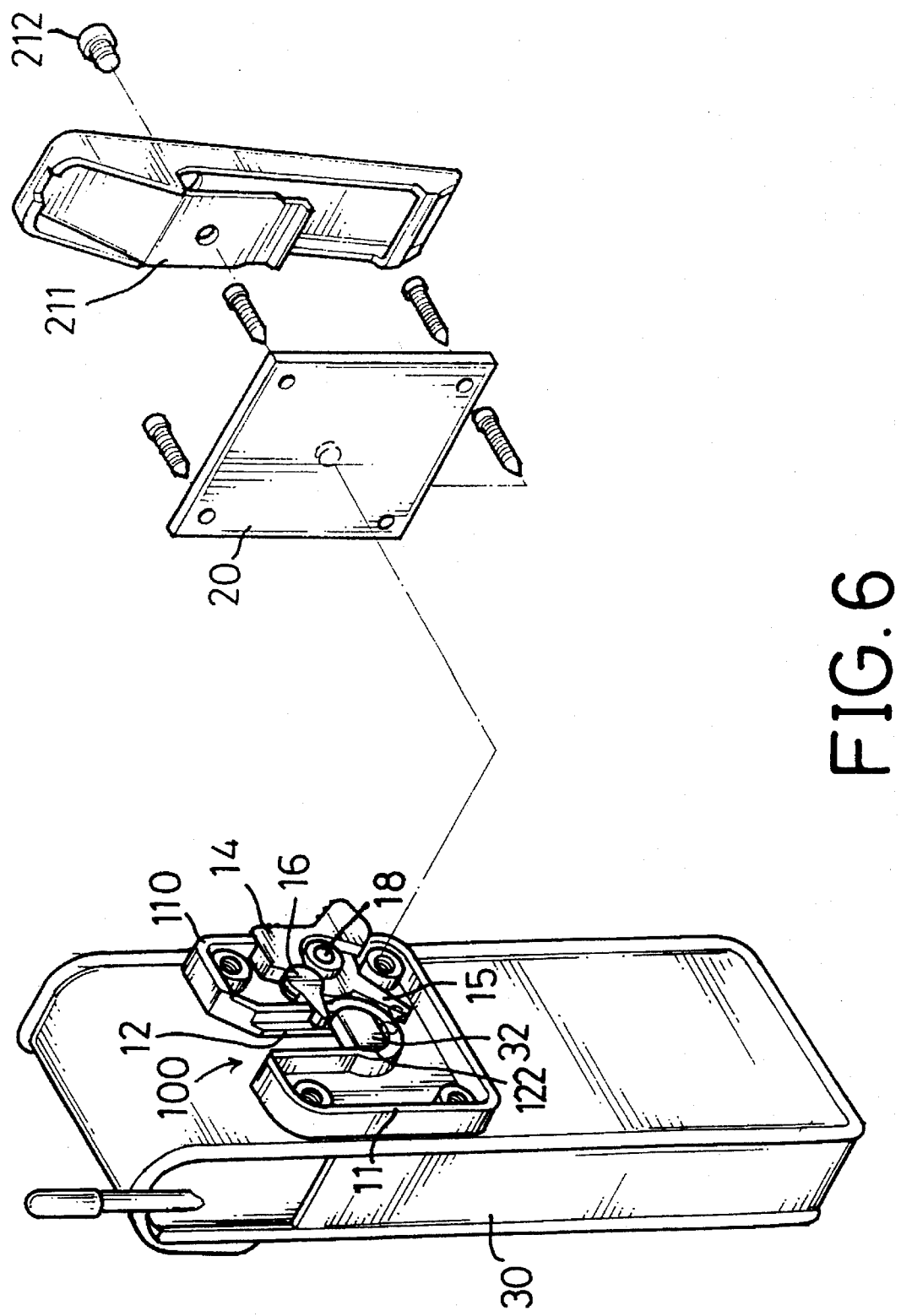
FIG. 6 illustrates the switch of FIG. 5 is installed in the modified socket.
Figure 7:
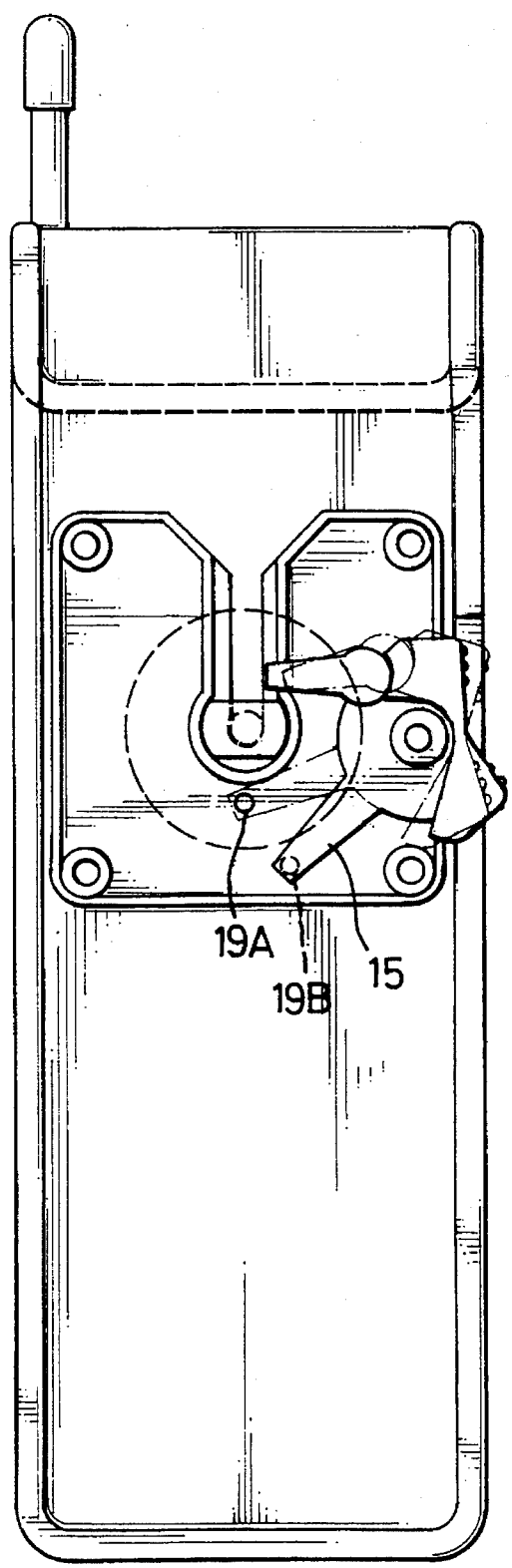
FIG. 7 illustrates the operation statuses of the switch in the socket, where the phantom line illustrates that the switch is in an unblocking status and the solid line illustrates that the switch is in a blocking status.

Referring to FIGS. 6 and 7, the switch body 14 is pivotally connected to the pivot 18 at the hole 140 (see FIG. 5), the saddle portion 141 of the switch body 14 protrudes out of the cutout 110A of the first wall 110 allowing a user to operate it, and the second tongue 16 has a tip portion (not labeled) passing through the cutout 120A of the second wall 120. Particularly referring to FIG. 7, normally, the switch 13 is in an "unblocking" status as shown with the phantom lines, where the protrusion 151 of the first tongue 15 is received in the first recess 19A of the base plate 11 and the tip of the second tongue 16 is retained in the cutout 120A of the second wall 120. The substantially elliptic plate 321 is allowed to slide along the ledge portion 12 around the cutout 100 when the switch 13 is in the "unblocking" status. Therefore, when a user wants to pulls out or put in his/her portable telephone, he/she has to make sure that the switch 13 is in the "unblocking" status. The switch 13 may be in a "blocking" status as shown with the solid lines, where the protrusion 151 of the first tongue 15 is received in the second recess 19B of the base plate 11 and the tip of the first tongue is retained beyond the cutout 120A of the second wall 120 and in contact with the ledge portion 12 of the base plate 11. The substantially elliptic plate 321 is not allowed to slide along the ledge portion 12 when the switch 13 is in the "blocking" status. Therefore, when a user wants to carry the portable telephone, he/she had better make sure that the switch 13 is in the "locking" status preventing the portable telephone from dropping from the socket 10. A user can operate the saddle portion 141 to change the switch 13 between the "blocking" status and the "unblocking" status.

Another embodiment is provided for some people, who do not use the leather pouch 30 but directly carry a portable telephone 90 without the leather pouch, where the engaging means 32 together with the positioning plate 31 may be attached on the portable telephone 90 by glue or a double-sided tape as shown in FIGS. 8 and 9, while other components such as the socket 10, the switch 13 and the cramp 21 are exactly the same as the previous embodiments. Therefore, a user can fix the portable telephone 90 on the socket 10 of FIG. 3 without a leather pouch.

Figure 10:
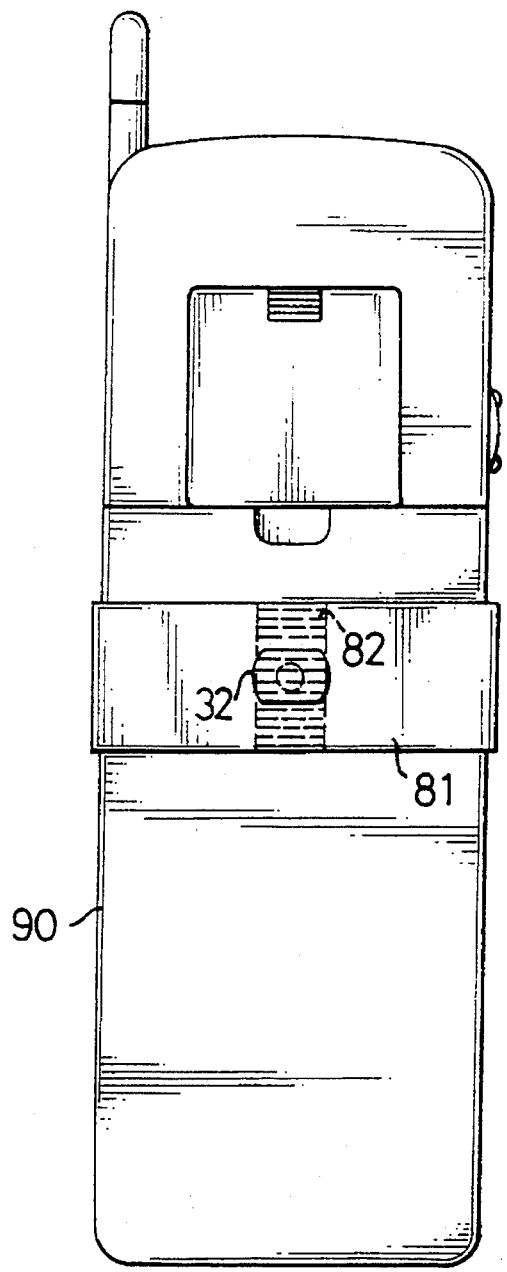
FIG. 10 illustrates another embodiment of the fixing apparatus of the present invention, where the engaging means is connected to a U-shaped plate which is engaged to a loop gap between two half casings of a portable telephone.
Figure 11:
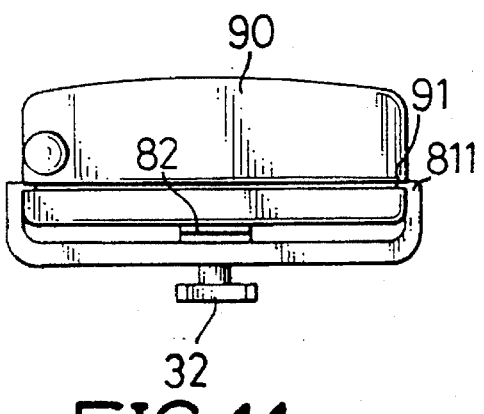
FIG. 11 illustrates the U-shaped plate is engaged to the loop gap of the portable telephone.

In another embodiment as shown in FIGS. 10 and 11, a U-shaped plate 81 is provided to engage itself on the portable telephone 90. It is known that there is always a loop gap defined in a loop intersection of an upper casing and a lower casing of a portable telephone. Specifically as shown in FIG. 11, the U-shaped plate 81 includes two tabs 811 extended from two ends thereof for engaging to the loop gap of the portable telephone 90. The engaging means 32 of the previous embodiment is now attached on the U-shaped plate 81. A resistive plate 82 such as a rubber plate or the like is positioned between the U-shaped plate 81 and a surface of the portable telephone 90 for increasing resistance therebetween, thus preventing the U-shaped plate 81 from sliding along the surface of the portable telephone 90.

I claim:

1. A fixing apparatus for a portable telephone comprising:

a pouch (30) adapted to enclose the portable telephone;

an engaging means (32) extending from the pouch (30), a socket (10) for detachably receiving the engaging means (32), and a cramp (21) connected to the socket (10) for fixing itself and the socket (10) on an objective body;

the engaging means (32) comprising a substantially elliptic plate (321) which defines a long axis and a short axis and a neck (322) extending from substantially a center of the elliptic plate (321) and firmly connected to the pouch (30);

the socket (10) comprising a base plate (11) and an upper plate (20) connected to the base plate (11), the base plate (11) defining a long cutout (100) from one side thereof up to a physically central point thereof, a first wall (110) being formed along peripheries of the base plate (11), a second wall (120) being projected from the base plate (11) substantially surrounding a periphery of the cutout (100) thus defining a ledge portion (12) between the cutout (100) and the second wall (120), the second wall (120) including two parallel straight portions (121) and a C-shaped portion (122) connected to the two parallel straight portions (121);

the engaging means (32) being sized to be slidable through the ledge portion (12) around the cutout (100), with the neck (322) passing through the cutout (100) and the substantially elliptic plate (321) sliding along the ledge portion (12) in the long axis direction;

a pivot (18) extended from the base plate (11), a first cutout (110A) defined in the first wall (110) of the base plate (11), a second cutout (120A) defined in the second wall (120) of the base plate (11), a first recess (19A) and a second recess (19B) defined in the base plate (11), a switch (13) comprising a switch body (14) which includes a boss (140) for pivotally receiving the pivot (18) projected from the base plate (11) and a saddle portion (141) extending out of the first cutout (110A) of the first wall (110) allowing a user to operate it;

a first tongue (15) extended from the switch body (14); and a second tongue (16) pivotally connected to the switch body (14);

whereby the engaging means (32) is manually made to turn substantially ninety-degrees in the C-shaped portion (122) of the second wall (120) when the substantially elliptic plate (321) thereof slides to touch the C-shaped portion (122) of the second wall (120), thereby locating the engaging means (32) in the C-shaped portion (122) of the second wall (120) of the socket (10) in place; and whereby the switch (13) is operative to an unblocking status in which the protrusion (151) of the first tongue (15) is received in the first recess (19A) of the base plate (11) and a tip of the second tongue (16) is retained in the second cutout (120A) of the second wall (120) allowing the substantially elliptic plate (321) to slide along the ledge portion (12), or to a blocking status in which the protrusion (151) is received in the second recess (19B) of the base plate (11) and the tip of the second tongue (16) is retained beyond the second cutout (120A) of the second wall (120) and blocking the ledge portion (12) of the base plate (11).

2. A fixing apparatus for a portable telephone as claimed in claim 1 wherein the switch body (14) defines a hole (144) at a corner thereof and the second tongue (16) has a rod (161) projected therefrom for pivotally engaging the hole (144) of the switch body (14).

3. A fixing apparatus for a portable telephone comprising:

an engaging means (32) connected to a surface of the portable telephone, a socket (10) for detachably receiving the engaging means (32), and a cramp (21) connected to the socket (10) for fixing itself and the socket (10) on an objective body;

the engaging means (32) comprising a substantially elliptic plate (321) which defines a long axis (323) and a short axis (324) through a center thereof, a neck (322) extending from substantially the center of the elliptic plate (321), and a positioning plate (31) connected to the neck (322) and firmly connected to the surface of the portable telephone;

the socket (10) comprising a base plate (11) and an upper plate (20) connected to the base plate (11), the base plate (11) defining a long cutout (100) from one side thereof up to a physically central point thereof, a first wall (110) being formed along a periphery of the base plate (11), a second wall (120) being projected from the base plate (11) substantially surrounding a periphery of the cutout (100) thus defining a ledge portion (12) between the cutout (100) and the second wall (120), the second wall 120 including two parallel straight portions (121) and a C-shaped portion (122) connected to the two parallel straight portions (121);

the engaging means (32) being sized to be slidable through the ledge portion (12) around the cutout (100), with the neck (322) passing through the cutout (100) and the substantially elliptic plate (321) sliding along the ledge portion (12) in the long axis direction;

whereby the engaging means (32) is manually made to turn substantially ninety-degrees in the C-shaped portion (122) of the second wall (120) when the substantially elliptic plate (321) thereof slides to touch the C-shaped portion (122) of the second wall (120), thereby locating the substantially elliptic plate (321) in the C-shaped portion (122) of the second wall (120) of the socket (10) in place.

4. A fixing apparatus for a portable telephone as claimed in claim 3, wherein the cramp (21) has a relatively long prong (210) and a relatively short prong (211) connected to the relatively long prong (210), the relatively short prong (211) defining a hole (215) therein and the upper plate (20) defining a threaded recess (26) therein thus allowing a bolt (212) to engage the relatively prong (211) to the upper plate (20), when the cramp (21) is worn on the objective body, the relatively short prong (211) exerts tension on the objective body thus fixing the cramp (21) together with the socket (10) on the objective body, with a head (212A) of the bolt (212) abutting the objective body thus strengthening the fixing of the cramp (21) on the objective body.

5. A fixing apparatus for a portable telephone as claimed in claim 3 further comprising a pivot (18) extended from the base plate (11), a first cutout (110A) defined in the first wall (110) of the base plate (11), a second cutout (120A) defined in the second wall (120) of the base plate (11), a first recess (19A) and a second recess (19B) defined in the base plate 11, a switch (13) comprising a switch body (14) which includes a boss (140) for pivotally receiving the pivot (18) projected from the base plate (11) and a saddle portion (141) extending out of the first cutout (110A) of the first wall (110) allowing a user to operate it, a first tongue (15) extended from the switch body (14), and a second tongue (16) pivotally connected to the switch body 14; whereby the switch (13) is operative to a unblocking status in which the protrusion (151) of the first tongue (15) is received in the first recess (19A) of the base plate (11) and a tip of the second tongue (16) is retained in the second cutout (120A) of the second wall (120) allowing the substantially elliptic plate (32) to slide along the ledge portion (12), or to a blocking status in which the protrusion (151) is received in the second recess (19B) of the base plate (11) and the tip of the second tongue (16) is retained beyond the second cutout (120A) of the second wall (120) and blocking the ledge portion (12) of the base plate (11).

6. A fixing apparatus for a portable telephone as claimed in claim 3 wherein the switch body (14) defines a hole (144) at a corner thereof and the second tongue (16) has a rod (161) projected therefrom for pivotally engaging the hole (144) of the switch body (14).

7. An apparatus for mounting a portable telephone, comprising:

an engagement element (32) adapted to be associated with the portable telephone including a substantially elliptic plate (321) defining a long axis and a short axis and a neck (322) extending from the elliptic plate (321);

a socket (10) adapted to receive the engagement element (32), the socket (10) including a base plate (11) defining an outer periphery and an aperture (100) extending inwardly from the outer periphery, the aperture (100) defining an inner periphery, an upper plate (20) associated with the base plate (11), a first wall (110) along the outer periphery of the base plate (11), and a second wall (120) projecting from the base plate (11) and extending substantially about the inner periphery such that a ledge portion (12) is provided between the aperture (100) and the second wall (120), the second wall (120) including two substantially parallel portions (121) and a C-shaped portion (122) associated with parallel portions (121); and a cramp (21) associated with the socket (10) adapted to be secured to an object;

wherein the substantially elliptic plate (321) is configured such that it is capable of passing through a space defined by the ledge portion (12) and the base plate (11) while the neck (322) passes through the aperture (100) when moving in a direction defined by the long axis and is also capable of being manually turned approximately ninety-degree when within a space defined by the C-shaped portion (122) of the second wall (120).

* * * * *